United States Patent
Brown et al.

(10) Patent No.: US 7,382,795 B2
(45) Date of Patent: Jun. 3, 2008

(54) MECHANISM FOR VALIDATING THE MESSAGE FORMAT FOR MESSAGE CHANNELS

(75) Inventors: Kyle G. Brown, Apex, NC (US); Robert Woolf, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 10/824,040

(22) Filed: Apr. 14, 2004

(65) Prior Publication Data

US 2005/0232291 A1    Oct. 20, 2005

(51) Int. Cl.
    H04L 12/28    (2006.01)
    H04L 12/66    (2006.01)
    G06F 15/16    (2006.01)

(52) U.S. Cl. .................. 370/428; 370/355; 370/389; 709/229

(58) Field of Classification Search ........ 370/355–466; 709/206–230
    See application file for complete search history.

(56) References Cited

U.S. PATENT DOCUMENTS

| | | | | |
|---|---|---|---|---|
| 5,339,434 A | | 8/1994 | Rusis ......................... | 395/700 |
| 5,982,893 A | * | 11/1999 | Hughes ........................ | 705/75 |
| 6,445,919 B1 | | 9/2002 | Suonvieri .................... | 455/424 |
| 6,470,385 B1 | | 10/2002 | Nakashima et al. ........ | 709/224 |
| 2004/0030788 A1 | * | 2/2004 | Cimo et al. ................. | 709/229 |
| 2005/0076089 A1 | * | 4/2005 | Fonseca ....................... | 709/206 |
| 2005/0129191 A1 | * | 6/2005 | Kokko et al. ............. | 379/88.13 |
| 2005/0198154 A1 | * | 9/2005 | Xie et al. .................... | 709/206 |
| 2005/0215250 A1 | * | 9/2005 | Chava et al. ................ | 455/433 |
| 2006/0120358 A1 | * | 6/2006 | Narasimhan et al. ....... | 370/355 |
| 2007/0076857 A1 | * | 4/2007 | Chava et al. ............. | 379/88.17 |
| 2007/0130313 A1 | * | 6/2007 | King ........................... | 709/223 |

OTHER PUBLICATIONS

Kruczek, Tom, "MQSERIES: Part 1 What is Message Queing?", Technical Support, Jan. 1996.

* cited by examiner

Primary Examiner—M. Phan
(74) Attorney, Agent, or Firm—Bruce Clay; Rudolf O. Siegesmund; Gordon & Rees LLP

(57) ABSTRACT

A method for validating messages in a message queuing software environment before the messages are transmitted to the recipient programs comprising a Message Validating Program (MVP). The present invention makes the message queuing software more efficient by eliminating the transmission of invalid messages through the message channels. The MVP acquires the messages as they are originated by the sender program and analyzes the message by comparing the message header and the message body to validating criteria. The validating criteria are the properties, ranges, types, character sets, and formats of data in the message header and message body that the recipient programs will accept. If the message body and the message header meet the validating criteria, then the message is forwarded to the appropriate message queue. If the message body and/or the message header do not meet the validating criteria, then an error is indicated to the sender program.

7 Claims, 4 Drawing Sheets

MECHANISM FOR VALIDATING THE MESSAGE FORMAT FOR MESSAGE CHANNELS

FIELD OF THE INVENTION

The present invention is directed generally to a method for improving the efficiency of message traffic in message queuing software and specifically to a method for validating the messages before the messages enter the message queue.

BACKGROUND OF THE INVENTION

FIG. 1 is an illustration of the communication paths between a plurality of computer programs operating in a computer network. The computer programs may operate on a single computer, but most likely operate on a plurality of separate computers in a computer network. The computer network may be a simplified network connection such as a local area network (LAN) or may be a larger network such as a wide area network (WAN) or the Internet. As seen in FIG. 1, each of the four programs has a communication path with the three other programs. The programs can send messages to or receive messages from the other programs along the communication paths. While the design depicted in FIG. 1 is sufficient for a small number of programs, the number of communication paths becomes extensive in a large computer network. The design depicted in FIG. 1 also does not allow for a contingency communication method when one of the programs becomes unavailable. Consequently, a need arises for a method for allowing a plurality of programs to communicate wherein the number of communication paths is reduced and wherein a contingency communication method exists for instances when one of the programs becomes unavailable.

Message queuing software was developed to address the problems described above. Message queuing software is also known as store-and-forward software and message-oriented middleware. Examples of message queuing software are MICROSOFT® MSMQ, WEBSPHERE® MQ, and TIBCO®. As seen in FIG. 2, an element of the message queuing software called a message queue manager acts as an intermediary between the various programs. The message queue manager reduces the number of required communication paths. When one of the programs becomes unavailable, the message queue manager also stores the messages for the unavailable program in a message queue until the program becomes available. The message queue manager queues the messages, distributes the messages, and verifies that the messages are delivered to the appropriate recipient, thereby preventing loss of the messages. Thus, message queuing software solves the above stated problems and allows computer programs to communicate in a more efficient manner.

One of the processes involved in message queuing software is the validation of messages. When a recipient program receives a message, the recipient program validates the message to verify that the message is in the proper format. If the message is not in the proper format, the recipient program cannot process the message further but also has no easy way to inform the sender that its message is being ignored. One of the problems associated with the prior art message validation process is that the transmission of invalid messages from the sender program to the recipient program is an inefficient use of the message channels between the programs and the message queue manager. This problem is compounded when the sender program sends an invalid message to a plurality of recipient programs. A more efficient method would check the validity of the messages before the message is distributed to the recipient programs. Consequently, a need exists in the art for a method for validating messages in a message queuing environment in which the messages are validated prior to distribution to the recipient programs.

SUMMARY OF THE INVENTION

The present invention, which meets the needs identified above, is a method for validating messages in a message queuing software environment before the messages are transmitted to the recipient programs. The present invention makes the message queuing software more efficient by eliminating the transmission of invalid messages through the message channels. The software embodiment of the present invention is a Message Validating Program (MVP). The MVP acquires the messages as they are originated by the sender program. The MVP then analyzes the message by comparing the message header and the message body to validating criteria. The validating criteria are the properties, ranges, types, character sets, and formats of data in the message header and message body that the recipient programs will accept. If the message body and the message header meet the validating criteria, then the message is forwarded to the appropriate message queue for distribution to the recipient programs. If the message body and/or the message header do not meet the validating criteria, then the MVP notifies the sender program that the message cannot be forwarded to the intended message queue.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "computer" shall mean a machine having a processor, a memory, and an operating system, capable of interaction with a user or other computer, and shall include without limitation firewalls, desktop computers, notebook computers, tablet personal computers, personal digital assistants (PDAs), servers, handheld computers, and similar devices.

As used herein, the term "message" shall mean precisely formatted data that is sent and received by computer programs and may represent a request, report, or an event.

As used herein, the term "message body" shall mean a section of a message that contains the contents of the message, which must follow an expected structure.

As used herein, the term "message header" shall mean an information structure in a message that precedes and identifies the information that follows within the message, and describes specifics about the message that the message queuing software uses to handle the message, such as the properties of the message.

As used herein, the term "message queuing environment" shall mean a computer network that utilizes message queuing software to transfer messages between computer programs operating on the computer network.

As used herein, the term "message queue manager" shall mean the element of the message queuing software that stores the messages in the message queues for delivery to the recipient programs.

As used herein, the term "message queuing software" shall mean a computer program that controls the distribution of messages between a plurality of computer programs.

As used herein, the term "recipient program" shall mean a computer program in a message queuing environment that receives a message from a sender program.

As used herein, the term "sender program" shall mean a computer program in a message queuing environment that originates a message and sends the message to a recipient program.

As used herein, the term "validating criteria" shall mean a group of criterion that define the data type, range, character set, format, and properties that can be accepted by a recipient program.

Figure 3:
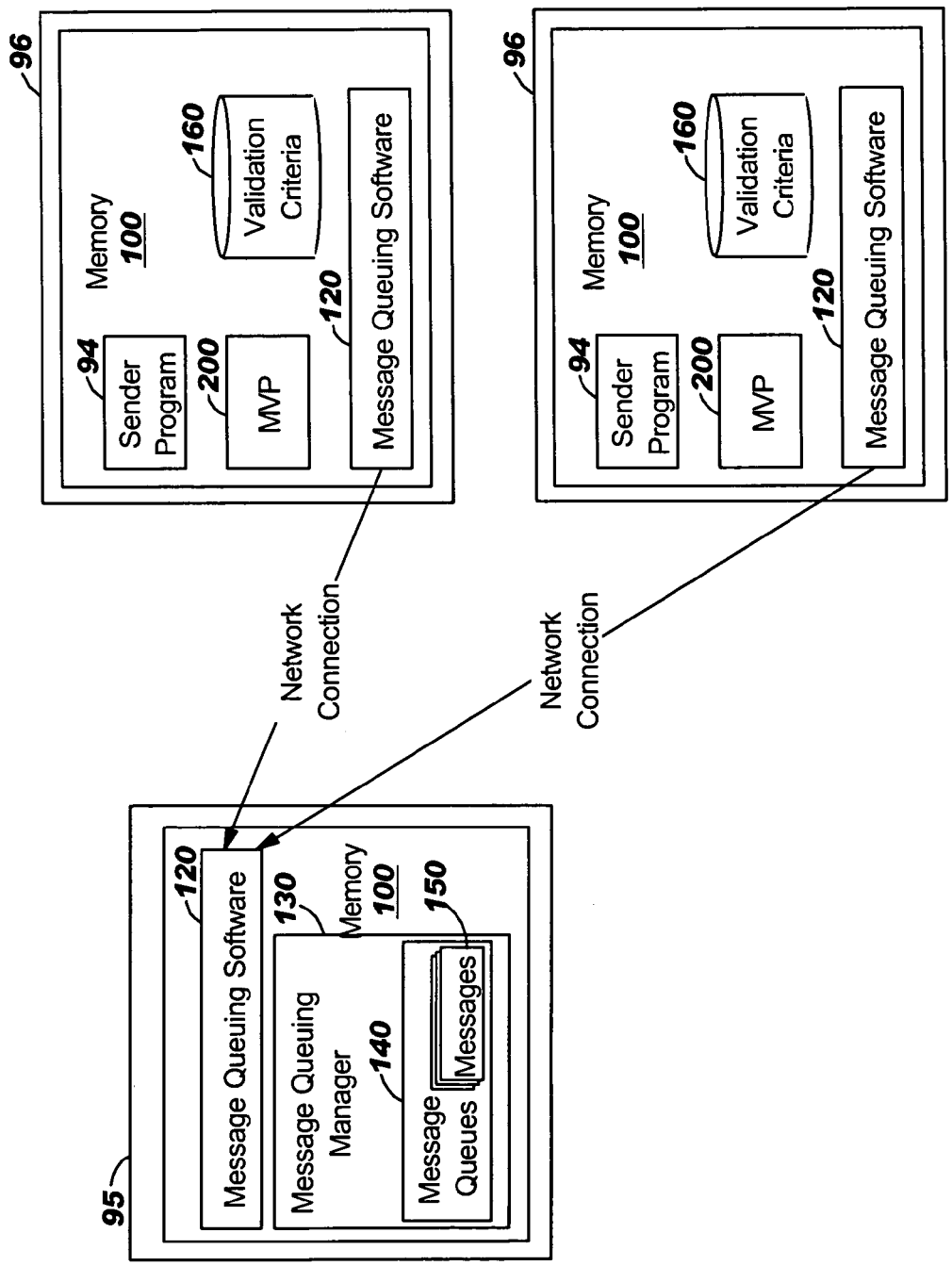
FIG. 3 is an illustration of a computer, including a memory and a network connection, containing the sender program associated with the present invention.

The internal configuration of a computer, including connection and orientation of the processor, memory, and input/output devices, is well known in the art. The present invention may be a method, a stand alone computer program, or a plug-in to an existing computer program. Persons of ordinary skill in the art are aware of how to configure computer programs, such as those described herein, to plug into an existing computer program. Referring to FIG. 3, the methodology of the present invention is implemented on software by Message Validation Program (MVP) 200. MVP 200 described herein is stored within the memory of every computer 96 containing message queuing software 120 and sender program 94. Alternatively, MVP 200 can be stored in an external storage device such as a removable disk, a CD-ROM, or a USB storage device. Memory 100 is illustrative of the memory within the computers of FIG. 3. Memory 100 also contains validating criteria 160. The programs within memory 100 can communicate with the message queue manager 130 via a network connection.

Figure 4:
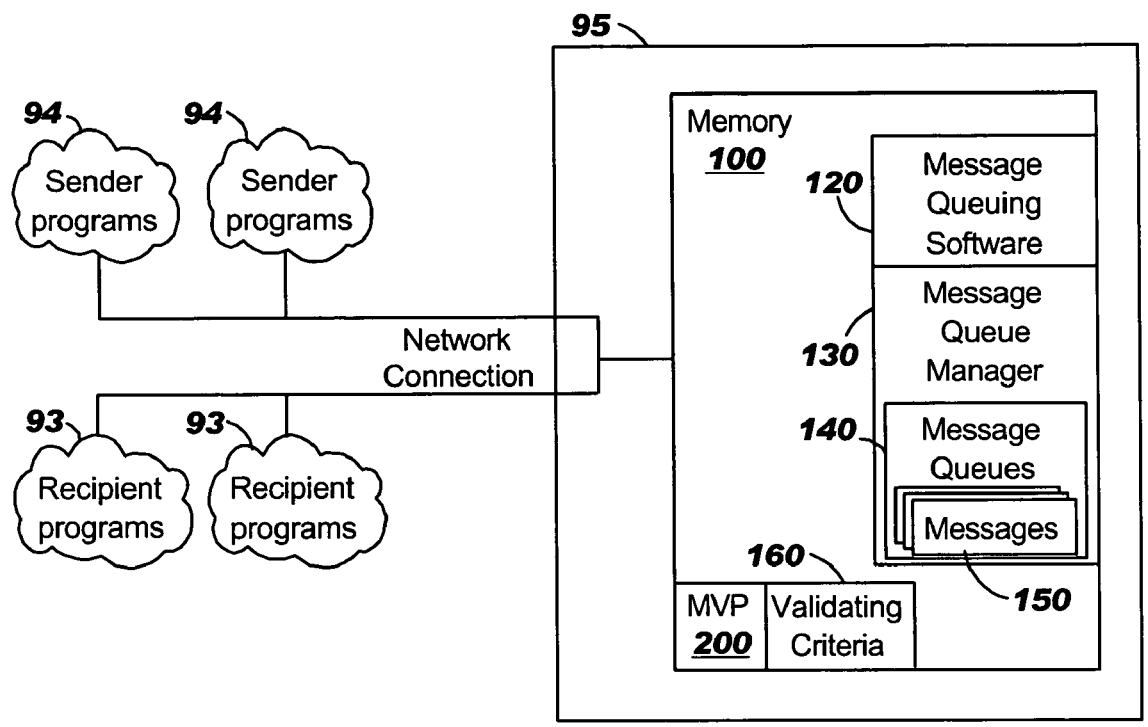
FIG. 4 is an illustration of a computer, including a memory and a network connection, containing the message queue manager associated with the present invention.

Referring to FIG. 4, the communications paths between computer 95, sender programs 94, and recipient programs 93 is illustrated. Sender programs 94 and recipient programs 93 communicate with the message queue manager 130 in message queuing software 120 via a network connection. Message queuing software 120 and message queues 140 can be stored in memory 100. Computer 95 is illustrative of a central computer, such as the message queue manager 130 depicted in FIG. 2. Memory 100 also contains message queuing software 120 and message queues 140.

Figure 1:
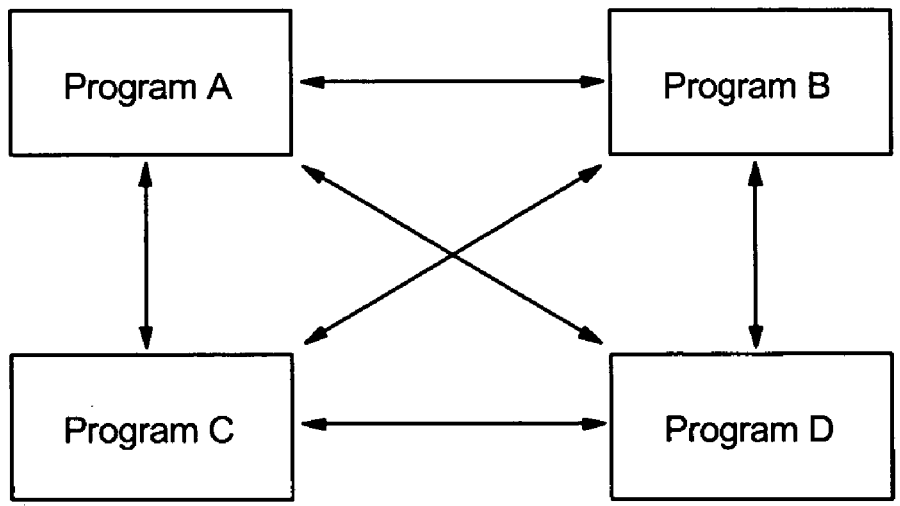
FIG. 1 is an illustration of the interaction of a plurality of computer programs in the absence of message queuing software.
Figure 2:
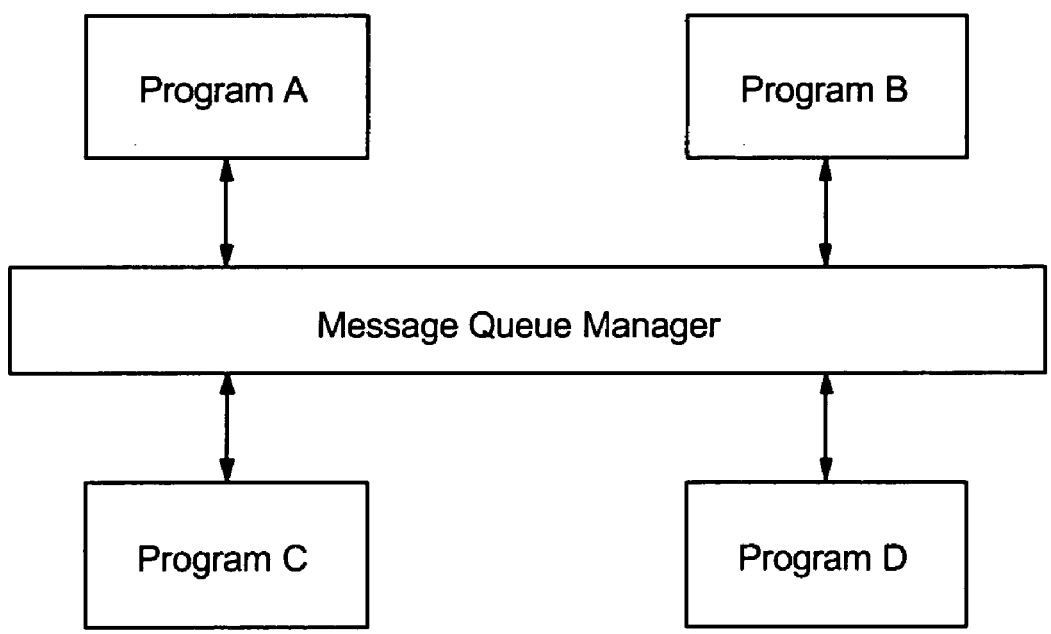
FIG. 2 is an illustration of the interaction of a plurality of computer programs utilizing message queuing software.

Message queuing software 120 is a software program that manages the distribution of messages to various programs and may include message queue manager 130 depicted in FIG. 2. Message queues 140 store a plurality of messages 150 for distribution to recipient programs 93. Validating criteria 160 is the criteria used by MVP 200 to validate messages 150. Validating criteria 160 specifies the properties, type, and range for message header 152 (See FIG. 5). Validating criteria 160 also specifies the type, character set, and format for message body 154 (See FIG. 5). As part of the present invention, the memory 100 can be configured with MVP 200, message queuing software 120, message queues 140, and/or validating criteria 160. Network connection and memory 100 are part of a computer 95, which may be a server computer. Network connection allows computer 95 to communicate with programs running on other computers, such as sender programs 94 and recipient programs 93.

In alternative embodiments, MVP 200, message queuing software 120, message queues 140, and/or validating criteria 160 can be stored in the memory of other computers. Storing MVP 200, message queuing software 120, message queues 140, and/or validating criteria 160 in the memory of other computers allows the processor workload to be distributed across a plurality of processors instead of a single processor. Further configurations of MVP 200, message queuing software 120, message queues 140, and/or validating criteria 160 across various memories, such as client memory and server memory, are known by persons of ordinary skill in the art.

Persons of ordinary skill in the art will appreciate that MVP 200 and validating criteria 160 are located in the same memory as sender programs 94. Locating MVP 200 and validating criteria 160 in the same memory as sender programs 94 allows each sender program 94 to validate the messages before the messages are sent from sender programs 94 to the message queue manager 130 in message queuing software 120. Thus, locating MVP 200 and validating criteria 160 in the same memory as sender programs 94 completely eliminates the transmission of invalid messages through the message channels. However, persons of ordinary skill in the art will also appreciate that MVP 200 and validating criteria 160 can be stored in the same computer as message queuing software 160 and message queues 140. Storing MVP 200 in the same computer as message queuing software 120 is advantageous because the computer network only contains one copy of MVP 200 and validating criteria 160. Thus, a person of ordinary skill in the art will appreciate that only one version of MVP 200 and validating criteria 160 would have to be updated.

Figure 5:
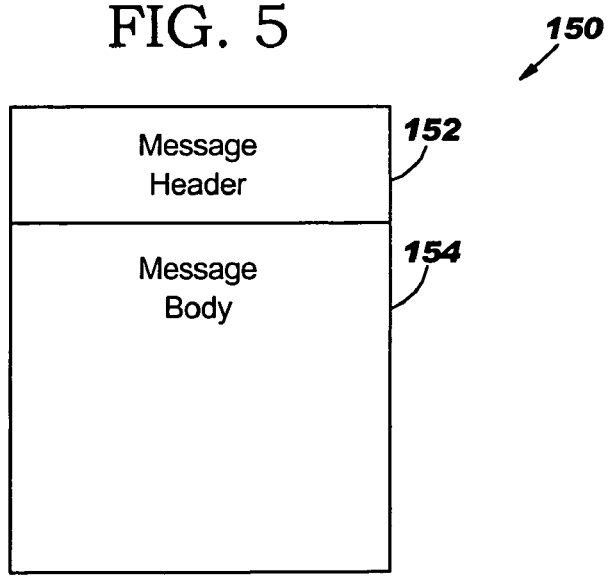
FIG. 5 is an illustration of the composition of a message associated with the present invention.

FIG. 5 is an illustration of the composition of message 150. Message 150 comprises message header 152 and message body 154. Message header 152 contains the properties associated with the message. Each message property has an expected structure. That structure is made of data type and format (and possibly range) but the declaration of that structure is declared outside of the message proper. Examples of information in message headers may include message ID, routing information, sender and recipient addresses, and so forth. Message body 154 contains the data comprising the message. This data has an associated structure (made up of data type, format, and range) but the declaration of that structure is declared outside of the message itself. Data Type refers to the interpretation of the bytes comprising a value. Examples of a data type include Integer, String, Byte Array, and so forth. The body of the message as a whole has a type (e.g. Object Message or XML Document). However, in general, the body will normally be a single large, composite piece of data that is comprised of several, smaller pieces of data, each having their own type, format, and range. Format refers to the fine structure of the data within a particular data type. For instance, a social security number has the format NNN-NN-NNNN where "N" represents a single digit of the form 0 through 9. Likewise, a Date in American format is of the form MM/DD/YYYY where MM is an integer between 1 and 12, DD is an integer between 1 and 31, and YYYY is a Gregorian year. Range defines minimum and maximum magnitudes that the data value must fall between. For instance, hours in a day are integers numbered between 1 and 12. String data will be represented using a particular character set. Examples of data character sets are ASCII and Unicode. Persons of ordinary skill in the art are aware of other character sets. If the type of the document as a whole is an XML document, then the format will conform to a specific XML Document Type Definition (DTD) or schema.

Figure 6:
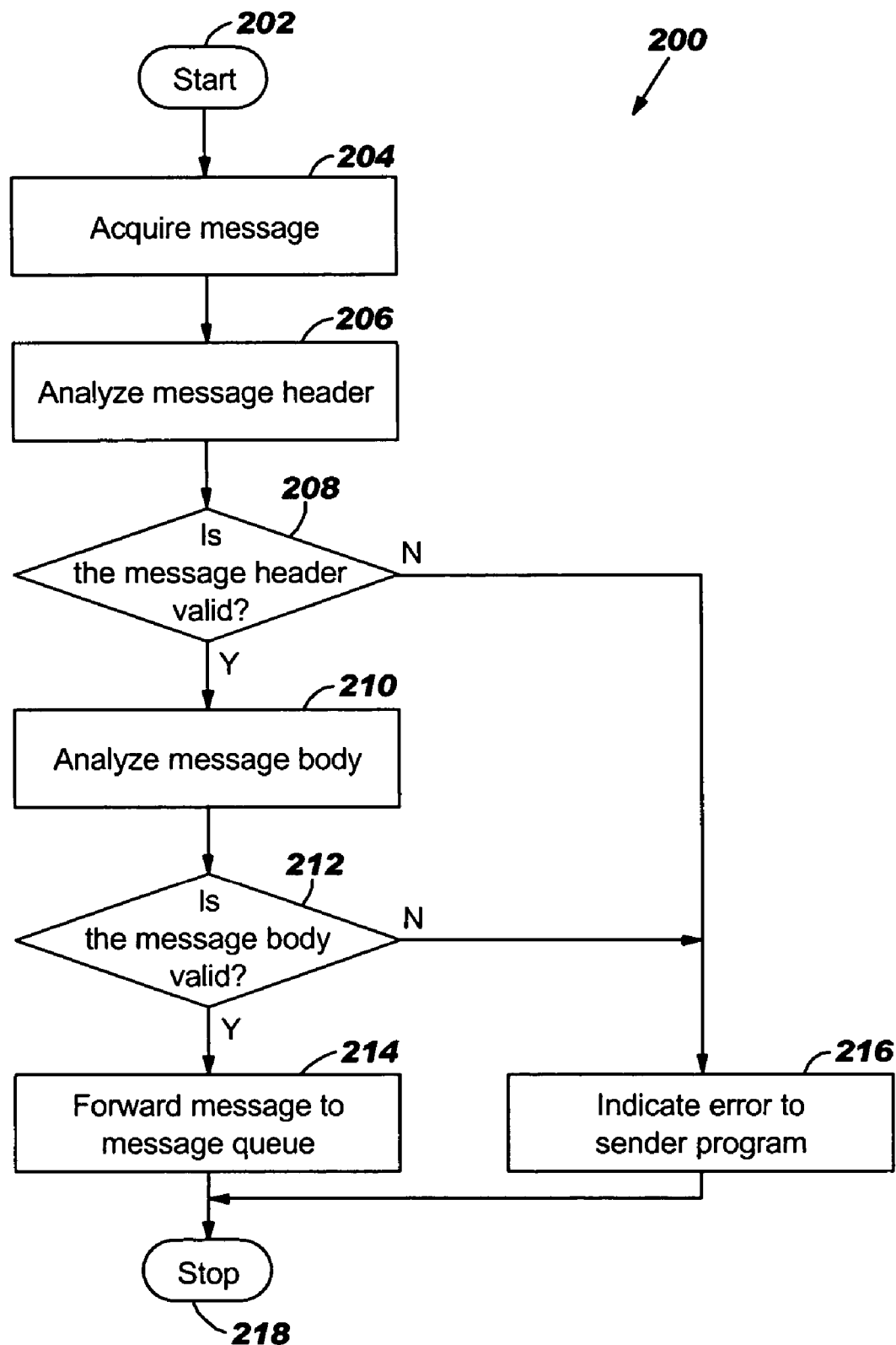
FIG. 6 is an illustration of the logic of the Message Validating Program (MVP) of the present invention.

FIG. 6 illustrates the logic of Message Validating Program (MVP) 200. MVP 200 is a software program that validates a message before sending the message to the recipient program. The message may be like message 150 depicted in FIGS. 3 and 4. MVP 200 starts (202) whenever a message is originated. MVP 200 acquires the message sent by the sender program (204). The sender program may be like sender program 94 depicted in FIG. 4. MVP 200 then analyzes the message header (206). In analyzing the message header, MVP 200 compares the message header to the validating criteria to determine if the data in the message header matches the validating criteria. The validating criteria are the properties, ranges, types, character sets, and formats of data in the message header and message body that the recipient programs will accept. The message header may be like message header 152 depicted in FIG. 5. The validating criteria may be like validating criteria 160 depicted in FIG. 4. The recipient programs may be like recipient programs 93 depicted in FIG. 4. MVP 200 then determines whether the message header is valid (208). If MVP 200 determines that the message header is not valid, then MVP 200 proceeds to step 216. If MVP 200 determines that the message header is valid, then MVP 200 proceeds to step 210.

At step 210 MVP 200 analyzes the message body (210). In analyzing the message body, MVP 200 compares the message body to the validating criteria to determine if the data in the message body matches the validating criteria. The message body may be like message body 154 depicted in FIG. 5. MVP 200 then determines whether the message body is valid (212). If MVP 200 determines that the message body is not valid, then MVP 200 indicates an error to the sender program (216) and ends (218). If MVP 200 determines that the message body is valid, then MVP 200 forwards the message to the appropriate message queue (214) and ends (218).

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method for validating a message having a message body, a message header, and a message footer in a message queuing environment wherein the message is validated before the message is sent to a recipient program, comprising:
   installing a message validation program on a computer;
   wherein the message validation program performs steps comprising:
      acquiring the message from a sender program;
      analyzing the message;
      comparing the message to a validating criteria;
      comparing a message property to a validating criteria property;
      determining whether the message is valid;
   wherein the message is valid only when the data in the message header and the message footer match the validation criteria and the message property matches the validating criteria property; and
   indicating an error to the sender program without forwarding the message to the message queue for distribution to the recipient program when the message is not valid.

2. The method of claim 1 wherein the comparing the message header to the validating criteria step comprises:
   comparing a message value to a validating criteria value; and
   wherein the message is valid only when the message value matches the validating criteria value.

3. The method of claim 2 further comprising:
   comparing a message type of the message body to a validating criteria type;
   wherein the message is valid only when the message type matches the validating criteria type.

4. The method of claim 3 further comprising:
   comparing a message character set of the message body to a validating criteria character set; and
   wherein the message is valid only when the message character set matches the validating criteria character set.

5. The method of claim 4 further comprising:
   comparing a message format of the message body to a validating criteria format; and
   wherein the message is valid only when the message format matches the validating criteria format.

6. The method of claim 5 wherein the message is validated by the sender program.

7. The method of claim 5 wherein the message is validated by a message queue manager.

* * * * *